US 8,630,589 B2

(12) United States Patent
Hoshihara et al.

(10) Patent No.: US 8,630,589 B2
(45) Date of Patent: Jan. 14, 2014

(54) ONBOARD RADIO COMMUNICATION SYSTEM

(75) Inventors: Yasunori Hoshihara, Tokyo (JP); Kazuyuki Tanaka, Tokyo (JP); Kinichiro Nishiyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 119 days.

(21) Appl. No.: 12/934,939

(22) PCT Filed: Apr. 16, 2009

(86) PCT No.: PCT/JP2009/001760
§ 371 (c)(1),
(2), (4) Date: Sep. 27, 2010

(87) PCT Pub. No.: WO2009/147777
PCT Pub. Date: Dec. 10, 2009

(65) Prior Publication Data
US 2011/0028163 A1 Feb. 3, 2011

(30) Foreign Application Priority Data
Jun. 6, 2008 (JP) .................................. 2008-149230

(51) Int. Cl.
*H04W 72/04* (2009.01)

(52) U.S. Cl.
USPC .............................. 455/63.1; 701/36; 375/144

(58) Field of Classification Search
USPC .............................. 455/448, 1, 62, 63.1, 63.3, 455/456.1–456.6; 375/144, 148, 344, 346; 701/1, 36
See application file for complete search history.

(56) References Cited

U.S. PATENT DOCUMENTS

| | | | | |
|---|---|---|---|---|
| 5,285,443 A * | 2/1994 | Patsiokas et al. | ............. | 370/280 |
| 6,414,986 B1 * | 7/2002 | Usui | ............................. | 375/142 |
| 8,280,583 B2 * | 10/2012 | Stahlin et al. | .................... | 701/36 |
| 2002/0165645 A1 * | 11/2002 | Kageyama | ........................ | 701/1 |
| 2006/0015242 A1 * | 1/2006 | Yoshida | ............................ | 701/96 |
| 2007/0106431 A1 * | 5/2007 | Tsuzuki et al. | .................... | 701/1 |
| 2007/0197230 A1 * | 8/2007 | Roggero et al. | ........... | 455/456.1 |
| 2008/0268768 A1 * | 10/2008 | Brown et al. | ...................... | 455/1 |
| 2008/0268769 A1 * | 10/2008 | Brown et al. | ...................... | 455/1 |
| 2009/0275299 A1 * | 11/2009 | Buch et al. | ................. | 455/161.1 |

FOREIGN PATENT DOCUMENTS

| | | |
|---|---|---|
| JP | 2000-309288 A | 11/2000 |
| JP | 2002-27040 A | 1/2002 |
| JP | 2002-230696 A | 8/2002 |
| JP | 2003-185444 A | 7/2003 |
| JP | 2003-224509 A | 8/2003 |
| JP | 2004-120081 A | 4/2004 |
| JP | 3607247 B2 | 1/2005 |
| JP | 2006-33264 A | 2/2006 |
| JP | 2007-243765 A | 9/2007 |

* cited by examiner

*Primary Examiner* — Kamran Afshar
*Assistant Examiner* — Khawar Iqbal
(74) *Attorney, Agent, or Firm* — Birch, Stewart, Kolasch & Birch, LLP

(57) ABSTRACT

Individual radio sets 12a-12e constituting an onboard radio communication system operate together with an adjacent vehicle detection unit (ultrasonic sensors 13a-13e) for detecting a second vehicle adjacent to a first vehicle 11. When it detects the adjacent vehicle, a radio interference decision unit constituting the radio sets 12a-12e decides radio interference due to an onboard radio communication system with the same radio scheme. When it detects the radio interference, a frequency channel switching unit constituting the radio sets 12a-12e switches the frequency channel to be used to avoid the interference of the radio waves.

18 Claims, 9 Drawing Sheets

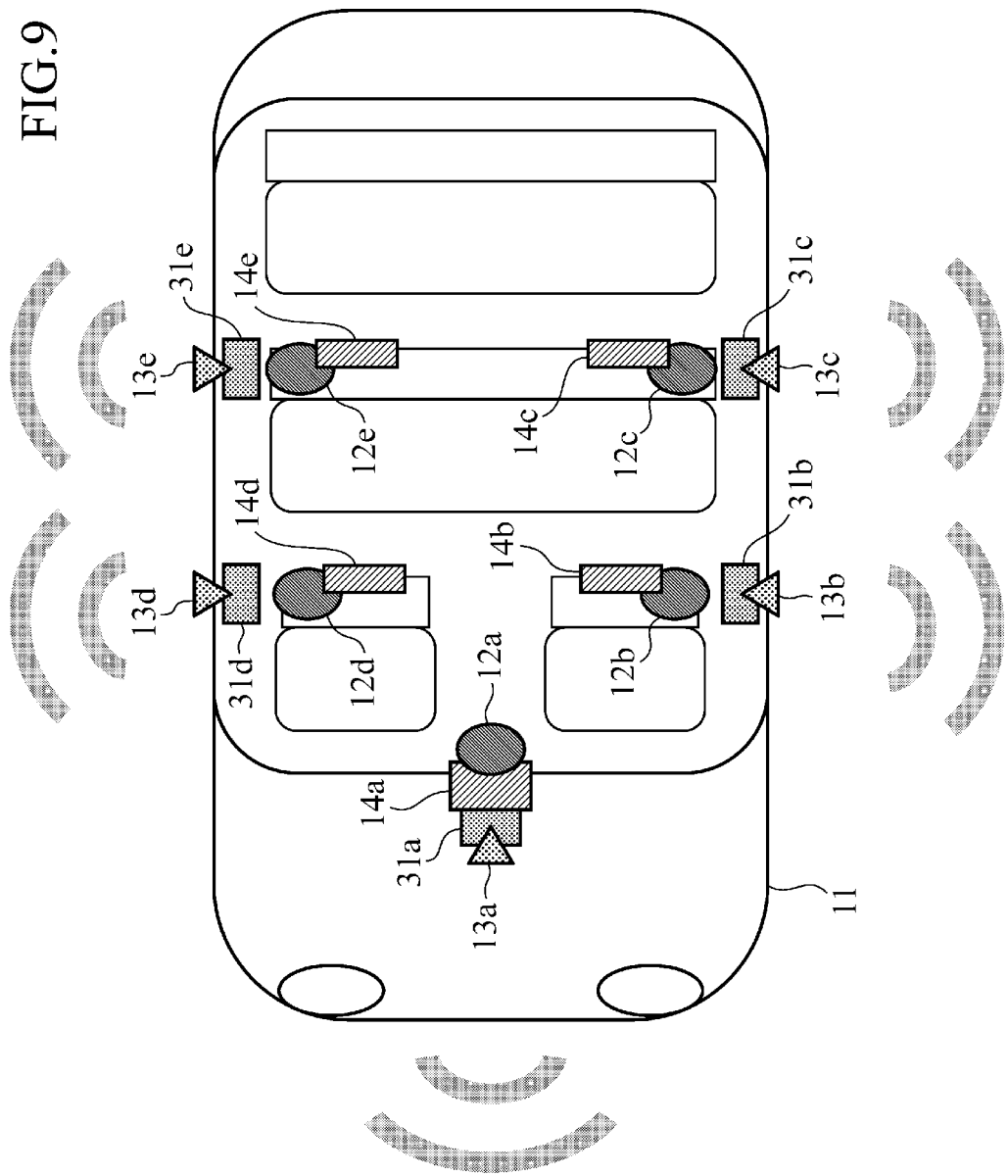

ONBOARD RADIO COMMUNICATION SYSTEM

TECHNICAL FIELD

The present invention relates to an onboard radio communication system constituting a radio network having a plurality of radio sets arranged in a vehicle for transmitting and receiving radio signals.

BACKGROUND ART

Recently, onboard information devices that have been developed centering on car navigation systems provide user applications having a variety of radio techniques.

As typical examples of them, a lot of radio communication systems can be mentioned: a system for detecting the vehicle position using a GPS (Global Positioning System), radio beacon or the like; a system for receiving a broadcast such as radio/television; a system for paying a toll using an ETC (Electronic Toll Collection System); a communication system such as a mobile phone and wireless LAN (Local Area Network) for making external communications; and a local radio communication system such as a Bluetooth (registered trademark) for connecting between a user device and an onboard information device. In addition, the ratio of mounting the user applications adopting these radio techniques on the onboard information devices has been increasing.

In the vehicle where the individual radio communication systems mentioned above are mixed, if radio systems using nearby frequency bands are mixed in particular, it is likely that deterioration in communication quality can occur because of radio interference, that is, noise resulting from radio waves used between the radio communication systems.

To circumvent such radio interference conventionally, a local radio communication device for a vehicle has been known which is implemented by using a bandpass filter (BPF) that has transmission spurious emission intensity characteristics with which a radio apparatus will have little effect on the other radio apparatuses among a plurality of onboard radio apparatuses, and by using a bandpass filter (BPF) that has receiving characteristics with which the radio apparatus is free from the effect of the interference due to transmission radio waves from the other radio apparatuses (see, Patent Document 1, for example).

In addition, to prevent communication quality deterioration due to occurrence of radio interference between them when using a radio beacon and a radio wave of an in-vehicle Bluetooth (registered trademark) (near a 2.4 GHz band, for example) at the same time, an onboard communication device is also known which makes a receiving state from a radio beacon station better by stopping communications using the in-vehicle Bluetooth (registered trademark) when detecting that the vehicle approaches the radio beacon station from the radio beacon station position and the vehicle's own position information in car navigation internal information (see Patent Document 2).

PRIOR ART DOCUMENTS

Patent Documents

Patent Document 1: Japanese Patent Laid-Open No. 2003-224509.
Patent Document 2: Japanese Patent Laid-Open No. 2003-185444.

According to the techniques disclosed in the foregoing Patent Documents 1 and 2 they can provide stable user applications by reducing communication quality deterioration by avoiding the radio interference with the other radio communication systems by adjusting and controlling the filter characteristics in the radio set, or by the radio set control using a combination of the car navigation internal information and the vehicle's own position information.

These techniques, however, do not ensure the reduction in the communication quality deterioration by avoiding the radio interference when the same radio communication systems exist at the same time.

Here, let us pay attention to the radio interference and communication quality deterioration when the same radio communication systems exist at the same time in a vehicle. As for an in-vehicle radio communication system connecting between onboard information devices, although it is assumed that a radio communication network is configured in a closed space in the vehicle using a local radio communication technique, not a little radio wave leakage to the outside of the vehicle is present. In addition, the level of the leakage will vary depending on the state of the vehicle such as its model or open/closed state of the windows.

As the mounting ratio of the onboard radio communication system increases, it is not unlikely that vehicles including the same communication systems become adjacent to each other so that the communication quality deterioration can occur from the radio interference due to the coexistence of the same radio communication systems. In particular, as for the onboard radio communication system connecting between the onboard information devices, a user application using continuous radio connection is supposed. In this case, it is a big problem to improve the performance of the onboard radio communication system by reducing deterioration in the communication quality directly affecting its services.

The present invention is implemented to solve the foregoing problems. Therefore it is an object of the present invention to provide an onboard radio communication system capable of improving its performance by reducing the communication quality deterioration due to radio interference even if a vehicle is adjacent which includes an onboard radio communication system using the same radio communication scheme.

DISCLOSURE OF THE INVENTION

To solve the foregoing problems, an onboard radio communication system in accordance with the present invention is an onboard radio communication system having a radio network constructed by arranging a plurality of radio sets for transmitting and receiving radio signals in a first vehicle, and includes: a radio transmitting and receiving unit for achieving timing synchronization on a fixed-period radio communication frame basis, for assigning, to a prescribed period at a head portion in the frame, report signals for reporting state management information about the radio sets to other radio sets and control signals for controlling the individual radio sets, for transmitting and receiving the report signals and the control signals, for selecting one of frequency channels capable of radio communications, and for transmitting and receiving the radio signals via the selected frequency channel in a time sharing manner; an adjacent vehicle detection unit for detecting a second vehicle adjacent to the first vehicle; a radio interference decision unit, which is started when the adjacent vehicle detection unit detects the adjacent second vehicle, for deciding the presence or absence of interference due to radio waves leaking from the second vehicle; and a frequency channel switching unit for switching, when the radio interference decision unit decides that the radio interference is present, a frequency channel in use by scanning other switchable frequency channels, and by reporting a frequency channel with which the scanning succeeds to the other radio sets via the report signals.

According to the onboard radio communication system in accordance with the present invention, even if the vehicle containing the onboard radio communication system using the same radio communication scheme adjoins, it can improve the performance by suppressing communication quality deterioration due to the radio interference.

BRIEF DESCRIPTION OF THE DRAWINGS

FIG. 9 is a diagram showing a system configuration of an onboard radio communication system of an embodiment 3 in accordance with the present invention.

BEST MODE FOR CARRYING OUT THE INVENTION

The best mode for carrying out the invention will now be described with reference to the accompanying drawings to explain the present, invention in more detail.

Embodiment 1

Figure 1:
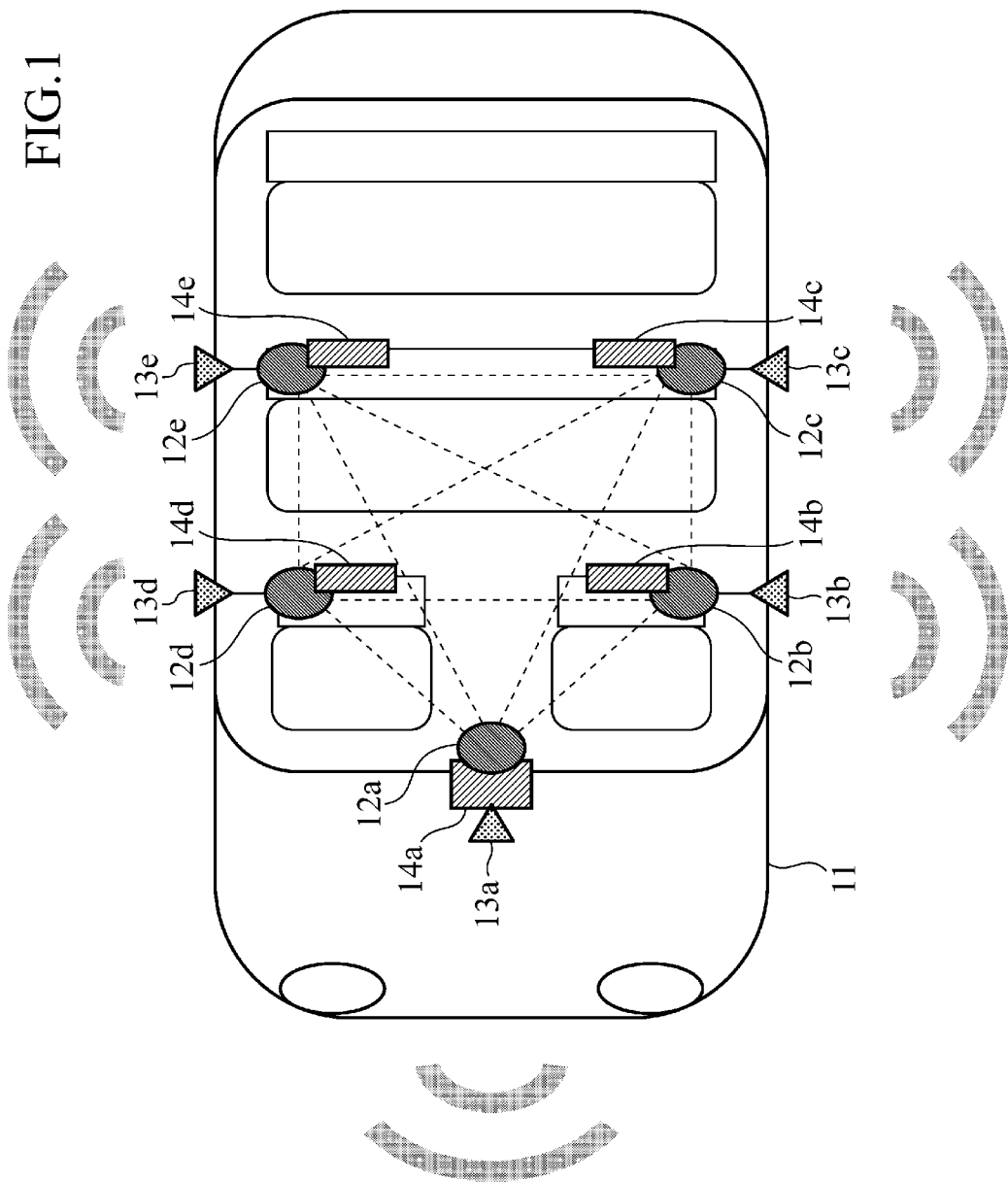
FIG. 1 is a diagram showing a system configuration of an onboard radio communication system of an embodiment 1 in accordance with the present invention.

FIG. 1 is a diagram showing a system configuration of an onboard radio communication system of an embodiment 1 in accordance with the present invention. As shown in FIG. 1, the onboard radio communication system of the embodiment 1 in accordance with the present invention comprises a vehicle itself 11, and a plurality of radio sets 12$a$-12$e$ arranged in the vehicle, ultrasonic sensors 13$a$-13$e$, for example, for detecting an adjacent vehicle, and onboard information devices 14$a$-14$e$.

Figure 2:
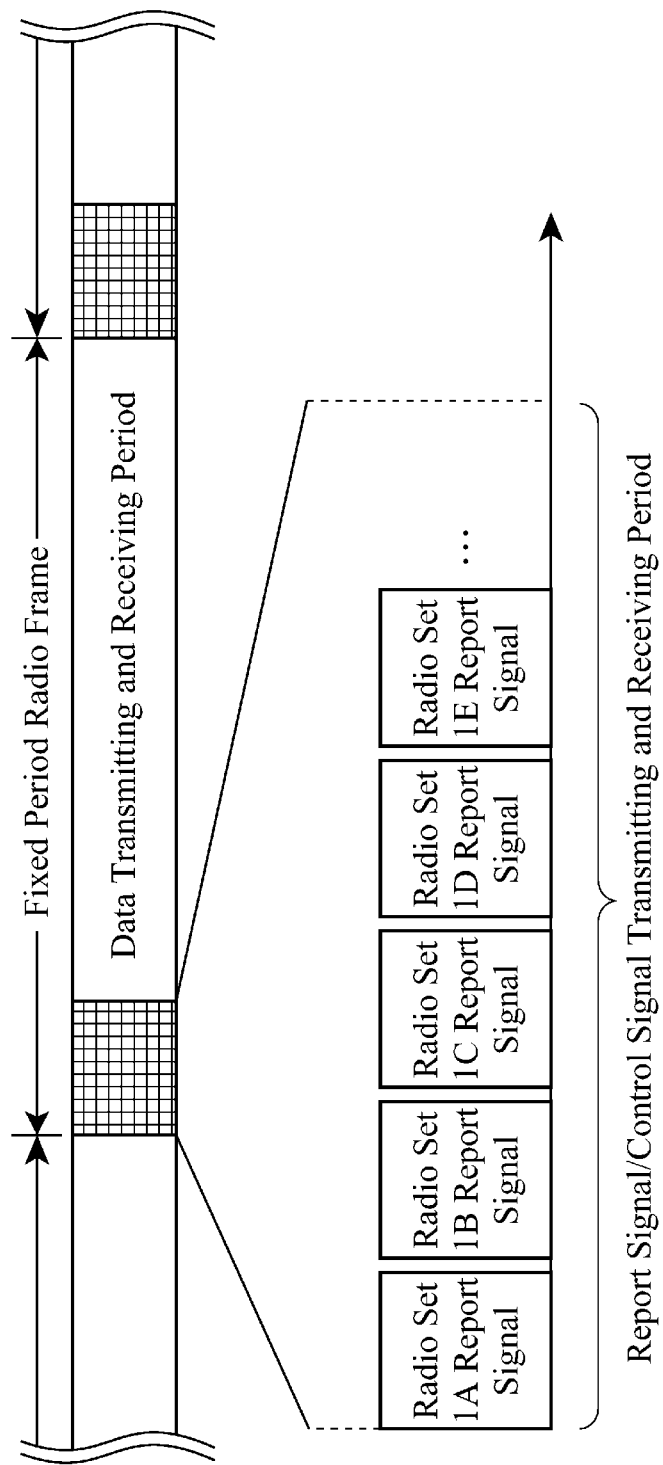
FIG. 2 is a diagram showing an example of a communication frame structure used by the onboard radio communication system of the embodiment 1 in accordance with the present invention.

The radio sets 12$a$-12$e$ carry out communications between them by transmitting and receiving radio signals. Each of the radio sets 12$a$-12$e$ achieves timing synchronization on a fixed-period frame basis as in FIG. 2 which shows a structural example of a radio communication frame. In addition, to a fixed period at the head of the frame, report signals 1A-1E are assigned for delivering state management information about them to the radio sets 12$a$-12$e$ constituting the radio network, and control signals are assigned for controlling functions of the radio sets 12$a$-12$e$. Thus they transmit and receive the report signals and control signals using that period. Furthermore, besides the head portion mentioned above, another period for transmitting and receiving data body between the radio sets 12$a$-12$e$ is assigned for transmitting and receiving the data using that period.

Incidentally, as for the foregoing report signals, since they are transmitted and received frame by frame, the radio set 12$a$, for example, can learn the states of the other radio sets 12$b$-12$e$ constituting the radio network. In addition, the control signals are transmitted and received as the need arises for controlling the individual radio sets 12$a$-12$e$.

Figure 3:
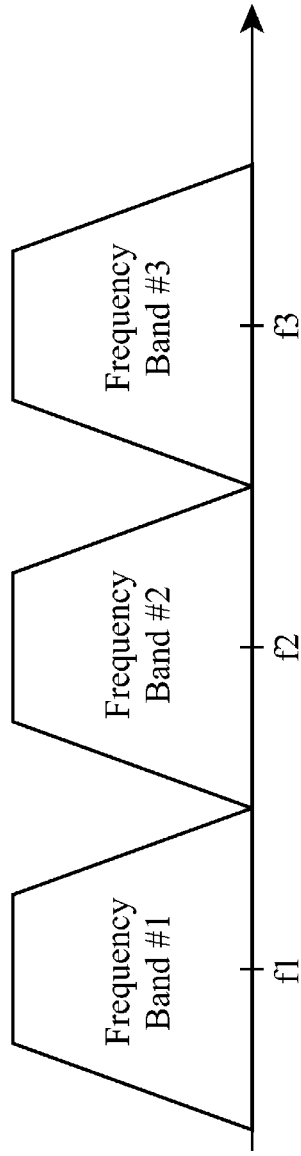
FIG. 3 is a diagram showing an example of frequency channels used by the onboard radio communication system of the embodiment 1 in accordance with the present invention.

The radio sets 12$a$-12$e$ have a plurality of frequency channels formed by combining a plurality of frequency bands with a hopping technique as in FIG. 3, which shows allocation of the frequency channels, and carry out radio communications by selecting one of the channels.

It is assume here as shown in FIG. 3 that a plurality of frequency bands (frequency bands #1, #2, #3) are assigned to a single frequency channel in a time sharing manner, and CH4 or higher that repeats data transmission and reception is selected from them for transmitting and receiving. Thus, the individual radio sets 12$a$-12$e$ operate as a radio transmitting and receiving unit for achieving timing synchronization on a fixed-period radio communication frame basis, for assigning, to a prescribed period at a head portion in the frame, report signals for reporting state management information about the radio sets to other radio sets and control signals for controlling the individual radio sets to transmit and receive these signals, for selecting one of the frequency channels capable of radio communications, and for transmitting and receiving the radio signals via the selected frequency channel in a time sharing manner.

Incidentally, as the radio scheme employed here, is supposed a wireless LAN or UWB (Ultra Wide Band) based on the MB-OFDM (Multi Band-Orthogonal Frequency Division Multiplex) scheme.

The UWB, which is ultra wide band radio communications using a bandwidth of 500 MHz or more, is known of having low power consumption, being strong against interference and able to carry out high-speed communication in a short distance area with a radius of 10 m or less.

On the other hand, it is assumed here that the ultrasonic sensors 13$a$-13$e$ are used as "an adjacent vehicle detection unit for detecting a second vehicle adjacent to a first vehicle".

The ultrasonic sensors 13$a$-13$e$ detect the adjacent vehicle by sending ultrasonic waves to the outside of the vehicle with a transmitter and by measuring the distance by receiving reflected waves with a receiver. The ultrasonic sensors 13$a$-13$e$ can be replaced by onboard cameras or radars. In this case, the onboard cameras or radars detect the adjacent vehicle by image recognition or by measuring reflected waves in the same manner as the ultrasonic sensors, respectively.

Incidentally, the onboard information devices 14$a$-14$e$ are a device such as a car navigation system, a DVD (Digital Versatile Disc) playback unit, a television set and a display monitor for providing user applications.

Figure 4:
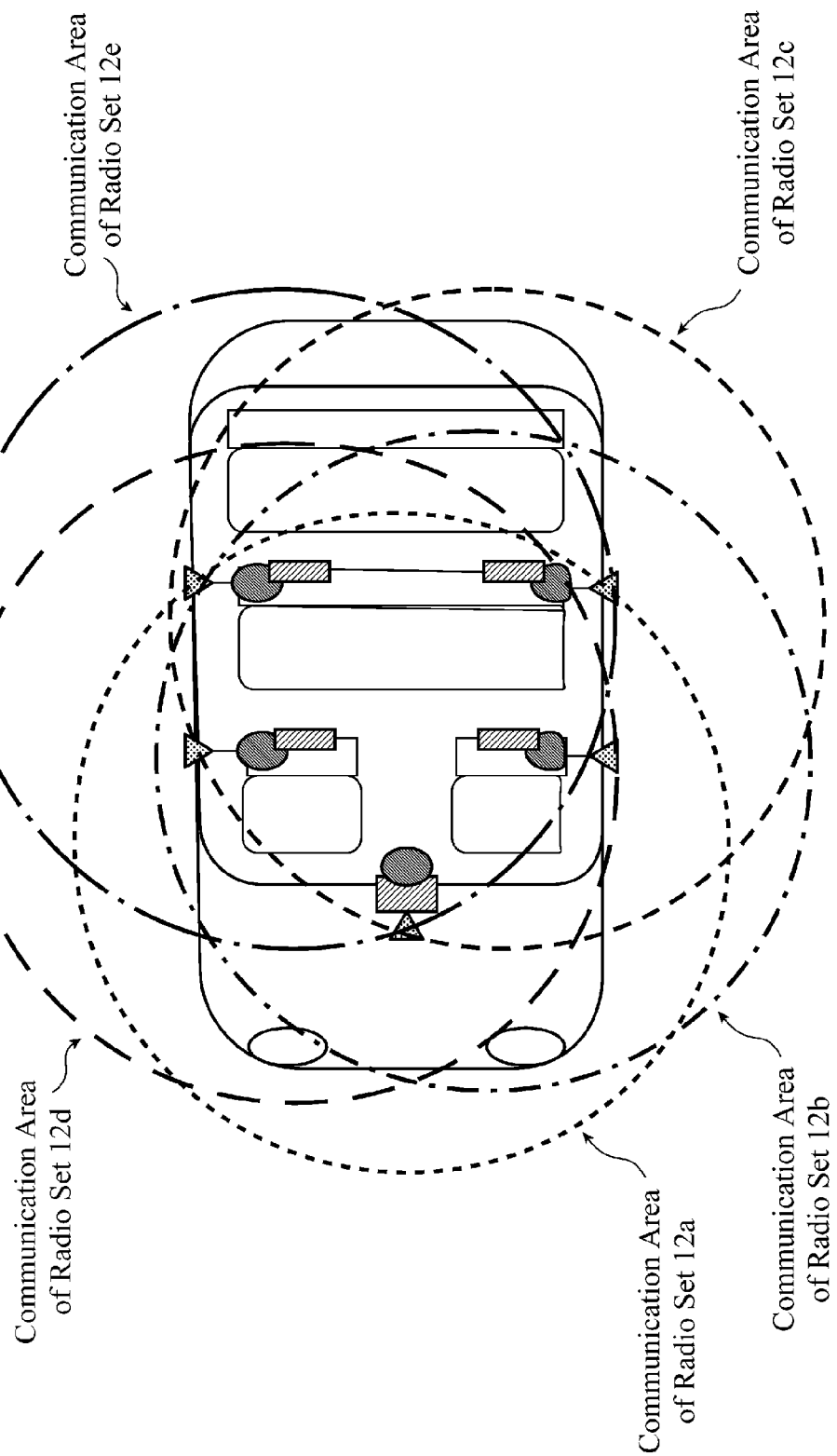
FIG. 4 is a diagram showing communication areas of individual radio sets constituting the onboard radio communication system of the embodiment 1 in accordance with the present invention.

FIG. 4 shows an example of communication possible areas of the radio sets 12$a$-12$e$ in the vehicle. As shown in FIG. 4, although each communication possible area of the radio sets 12a-12e includes the other radio sets 12a-12e, it also spreads over regions having nothing to do with communications between the radio sets 12a-12e. In particular, spreading to the outside of the vehicle is not preferable because it is considered as radio wave leakage.

Here, when the vehicle has the radio network constructed in the vehicle and uses it singly as shown in FIG. 4, there arises no problem in terms of the communication quality. However, when a second vehicle 21 including the radio network with an onboard radio communication system that has the same radio scheme and the same frequency channels and comprises radio sets 22a-22e comes adjacent to the vehicle 11, the external radio wave leakage components from the onboard radio communication systems become radio interference sources to each other, thereby causing deterioration in the communication quality of the onboard radio communication systems.

For this reason, the onboard radio communication system of the embodiment 1 in accordance with the present invention tries to improve the performance by reducing the communication quality deterioration due to the radio interference. Its details will be described below.

Figure 5:
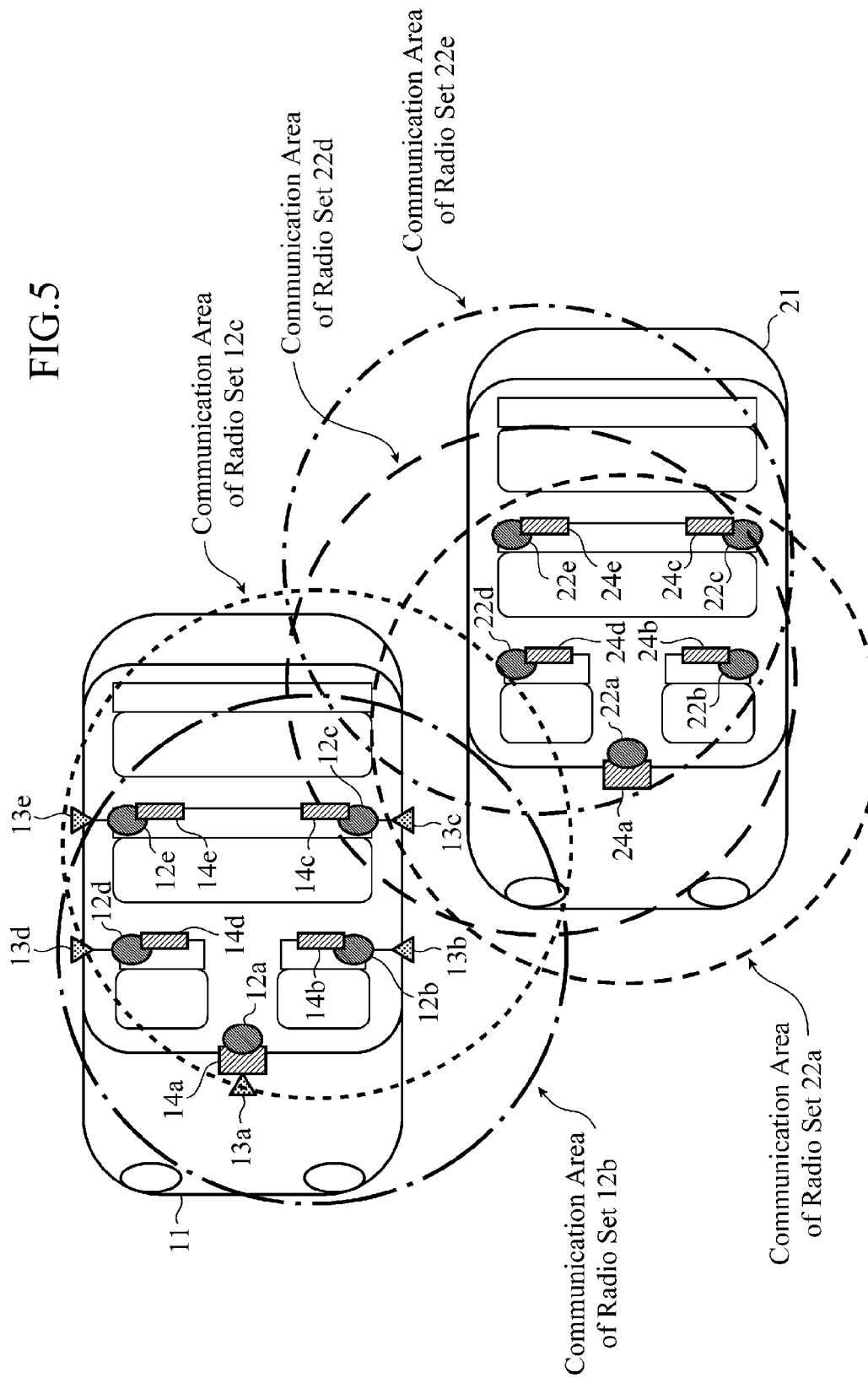
FIG. 5 is a diagram showing an interference state in communication areas when an adjacent vehicle is present in the onboard radio communication system of the embodiment 1 in accordance with the present invention.
Figure 6:
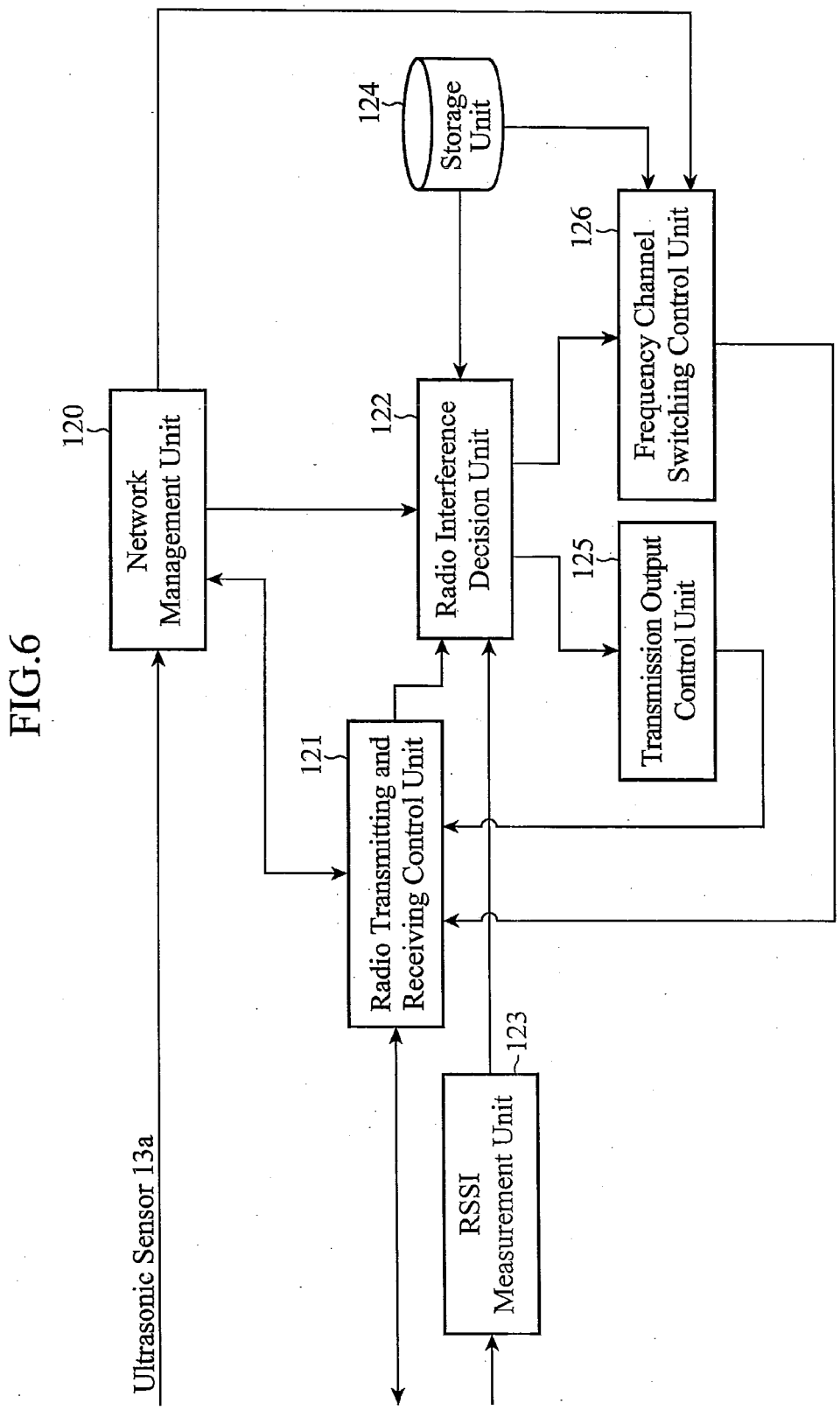
FIG. 6 is a block diagram showing an internal configuration of a radio set used in the onboard radio communication system of the embodiment 1 in accordance with the present invention.

FIG. 6 is a block diagram showing an internal configuration of the radio set (radio set 12a shown in FIG. 1, FIG. 4, and FIG. 5) of the onboard radio communication system of the embodiment 1 in accordance with the present invention. Incidentally, the radio sets 12b-12e are supposed to have the same configuration.

As shown in FIG. 6, the radio set 12a comprises a network management unit 120, a radio transmitting and receiving control unit 121, a radio interference decision unit 122, an RSSI measurement unit 123, a storage unit 124, a transmission output control unit 125, and a frequency channel switching control unit 126.

According to the report signals assigned to the head portion of the radio communication frame, the network management unit 120 manages the state management information on the individual radio sets 12a-12e, and controls the radio transmitting and receiving control unit 121, radio interference decision unit 122 and others according to the state management information. In particular, it controls a radio communication mode and a radio interference detection mode here.

The term "radio communication mode" refers to a mode that achieves the timing synchronization using the fixed-period frame as described above, that assigns, to the prescribed period at the head portion in the frame, the report signals for reporting the state management information about the radio set 12a to the other radio sets 12b-12d and the control signals for controlling the individual radio sets 12a-12d and transmits and receives these signals, and that selects one of the frequency channels capable of radio communications and transmits and receives the radio signals via the selected frequency channel in a time sharing mode.

In addition, the term "radio interference detection mode" refers to a mode that is started when the second vehicle adjacent to the vehicle 11 is detected, and that detects the presence or absence of the interference due to radio waves leaking from the adjacent vehicle 21. It is a mode that measures the received signal strength indication (RSSI) of the radio waves leaking from the adjacent vehicle 21 when the adjacent vehicle 21 employs the same frequency band as the frequency channel the vehicle 11 uses, and that decides the presence or absence of the radio interference by comparing it with an interference threshold stored in the storage unit 124.

Incidentally, the state management information mentioned above is supposed to include the operation mode of each of the radio sets 12a-12e, the frequency channel used in the "radio communication mode", and the position information about the adjacent vehicle detected with the ultrasonic sensors 13a-13e.

The radio transmitting and receiving control unit 121 controls the "radio communication mode" described above, and the radio interference decision unit 122 executes and controls the "radio interference detection mode" described above.

The radio interference decision unit 122 compares the received signal strength indication (RSSI) of the radio waves leaking from the adjacent vehicle, which is measured by the RSSI measurement unit 123, with the interference threshold stored in the storage unit 124, and outputs its result to the transmission output control unit 125 and frequency channel switching control unit 126. When the radio interference decision unit 122 makes a decision that the radio interference is not detected, the transmission output control unit 125 lowers the transmission output of the radio set 12a within a range that will not cause the quality deterioration in the radio communications in the vehicle, and supplies to the radio transmitting and receiving control unit 121. When the radio interference decision unit 122 makes a decision that the radio interference is present, the frequency channel switching control unit 126 scans other frequency channels that can replace, and switches the current frequency channel in use by reporting the frequency channel with which the scanning succeeds to the other radio sets 12b-12e via the report signals.

Incidentally, the storage unit 124 contains the state management information about the individual radio sets 12a-12e acquired through the communications (report signals), the interference level threshold used for deciding the presence or absence of the radio interference, a list of the switchable frequency channels and the like.

Figure 7:
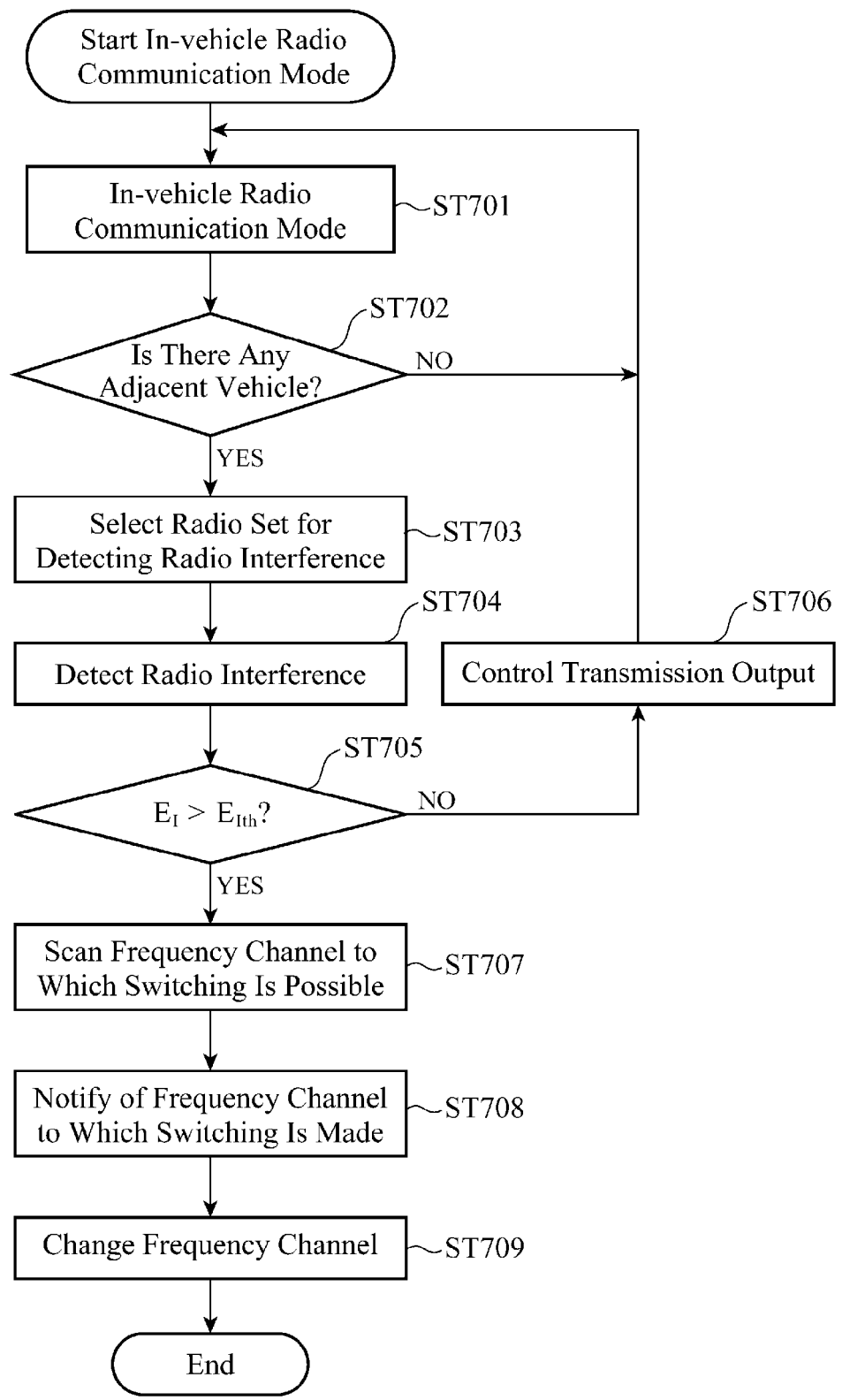
FIG. 7 is a flowchart showing the operation of the onboard radio communication system of the embodiment 1 in accordance with the present invention.

FIG. 7 is a flowchart showing the operation of the onboard radio communication system of the embodiment 1 in accordance with the present invention. It shows an operation procedure after a start of the radio communication mode within the vehicle 11.

Referring to the flowchart of FIG. 7, the operation of the onboard radio communication system of the embodiment 1 in accordance with the present invention will be described in detail below.

First, in the vehicle 11, the radio sets 12a-12e are in the "radio communication mode" (step ST701). Accordingly, the individual radio sets 12a-12e can learn the states of the other radio sets 12a-12e constituting the radio network by achieving synchronization using the frame structure shown in FIG. 2 and by transmitting and receiving the report signals for reporting the state management information in the head portion in the frame between them. The radio sets 12a-12e are further in the state of carrying out communications between the individual radio sets 12a-12e in accordance with the user applications.

When none of the ultrasonic sensors 13a-13e detects the adjacent vehicle 21 ("NO" at step ST702), the radio sets 12a-12e continue the "radio communication mode" (step ST701). On the other hand, when at least one of the ultrasonic sensors 13a-13e detects the adjacent vehicle ("YES" at step ST702), the radio sets 12a-12e proceed to radio set selection processing (step ST703) for detecting the radio interference.

As a radio set 12a-12e for detecting the radio interference, one of the radio sets 12a-12e constituting the radio network, which is closest to the adjacent vehicle is selected from the position information on the adjacent vehicle any one of the ultrasonic sensors 13a-13e detects. However, if the selected one of the radio sets 12a-12e is in the communication state because the user application is in operation, one of the radio sets 12a-12e which is second closest to the adjacent vehicle is selected as the radio set for detecting the radio interference.

Incidentally, the selection of the radio sets 12a-12e for detecting the radio interference described above is performed according to the state management information about the individual radio sets 12a-12e in the radio network, which includes the position information about the adjacent vehicle detected by the ultrasonic sensors 13a-13e, and which is transmitted and received using the report signals. More specifically, the network management unit 120 of each of the individual radio sets 12a-12e acquires the state management information about the individual radio sets 12a-12e via the report signals, and when a decision is made by referring to the state management information that one of the radio sets 12a-12e to which it belongs is closest to the adjacent vehicle and is not in the radio communication state, the selected one operates autonomously as a radio set for detecting the radio interference.

The radio set selected as described above (assumed to be 12a, here) shifts to the "radio interference detection mode". Here, it is supposed to be in the receiving state through a frequency channel used by the radio network in the vehicle 11 with the radio transmitting and receiving control unit 121. The RSSI measurement unit 123 measures the RSSI of radio signals received from other than the radio sets 12a-12e in the vehicle 11, and supplies the RSSI to the radio interference decision unit 122.

The radio interference decision unit 122 compares the RSSI (referred to as "interference level $E_I$") obtained by the measurement by the RSSI measurement unit 123 with the radio interference level threshold $E_{I\,t\,h}$ which is stored in the storage unit 124 and has an influence on the communication quality of the radio network in the vehicle 11 (step ST705).

When a decision of $E_I \leq E_{I\,t\,h}$ is made ("NO" at step ST705), the transmission output control unit 125 carries out, under the control of the radio interference decision unit 122, the transmission output control in the direction of lowering the transmission output level of the radio set 12a within a range that will not bring about the deterioration in the communication quality of the radio network in the vehicle to reduce the interference due to the radio wave leakage to the outside of the vehicle 11 (step ST706), and returns to the radio communication mode in the vehicle 11 at step ST701.

On the other hand, when a decision of $E_I > E_{I\,t\,h}$ is made ("YES" at step ST705), the radio interference decision unit 122 makes a decision that the deterioration in the communication quality due to the radio interference occurs in the radio network in the vehicle 11, and starts the frequency channel switching control unit 126. The frequency channel switching control unit 126 successively scans switchable frequency channels listed in the storage unit 124 according to the degree of priority, and decides the frequency channel without the radio interference with which the scanning succeeds (step ST707).

After deciding the frequency channel that can replace, the frequency channel switching control unit 126 notifies the other radio sets 12b-12e of the frequency channel switching and of the frequency channel to which the switching is made through the report signals via the radio transmitting and receiving control unit 121 (step ST708), and avoids the interference by making the frequency channel switching for all the radio sets 12a-12e in the vehicle 11 via the control signals at the same time (step ST709).

According to the radio communication system of the embodiment 1 in accordance with the present invention, the radio set 12a selected operates as the "radio interference decision unit" for making a decision of the presence or absence of the interference due to the radio waves leaking from the adjacent vehicle 21 when the adjacent vehicle detection unit (ultrasonic sensors 13a-13e) detects the adjacent vehicle 21, and operates as the "frequency channel switching unit" for switching the frequency channel in use by scanning the other switchable frequency channels when the radio interference decision unit decides that the radio interference is present, and by reporting the frequency channel with which the scanning succeeds to the other radio sets 12b-12e via the report signals.

Incidentally, one of the ultrasonic sensors 13a-13e operating as the "adjacent vehicle detection unit" in this case operates together with at least one of the plurality of radio sets 12a-12e, reports the position information about the adjacent vehicle 21 to the other radio sets 12a-12e using the report signals, and instructs the radio interference decision and frequency channel switching via the control signals at the same time.

Thus, according to the onboard radio communication system of the embodiment 1, even if a vehicle containing an onboard radio communication system with the same radio communication scheme is adjacent, the adjacent vehicle detection unit detects it, and the radio interference decision unit and the frequency channel switching unit can reduce the communication quality deterioration due to the radio interference, thereby being able to provide the onboard radio communication system capable of improving the performance.

Embodiment 2

Figure 8:
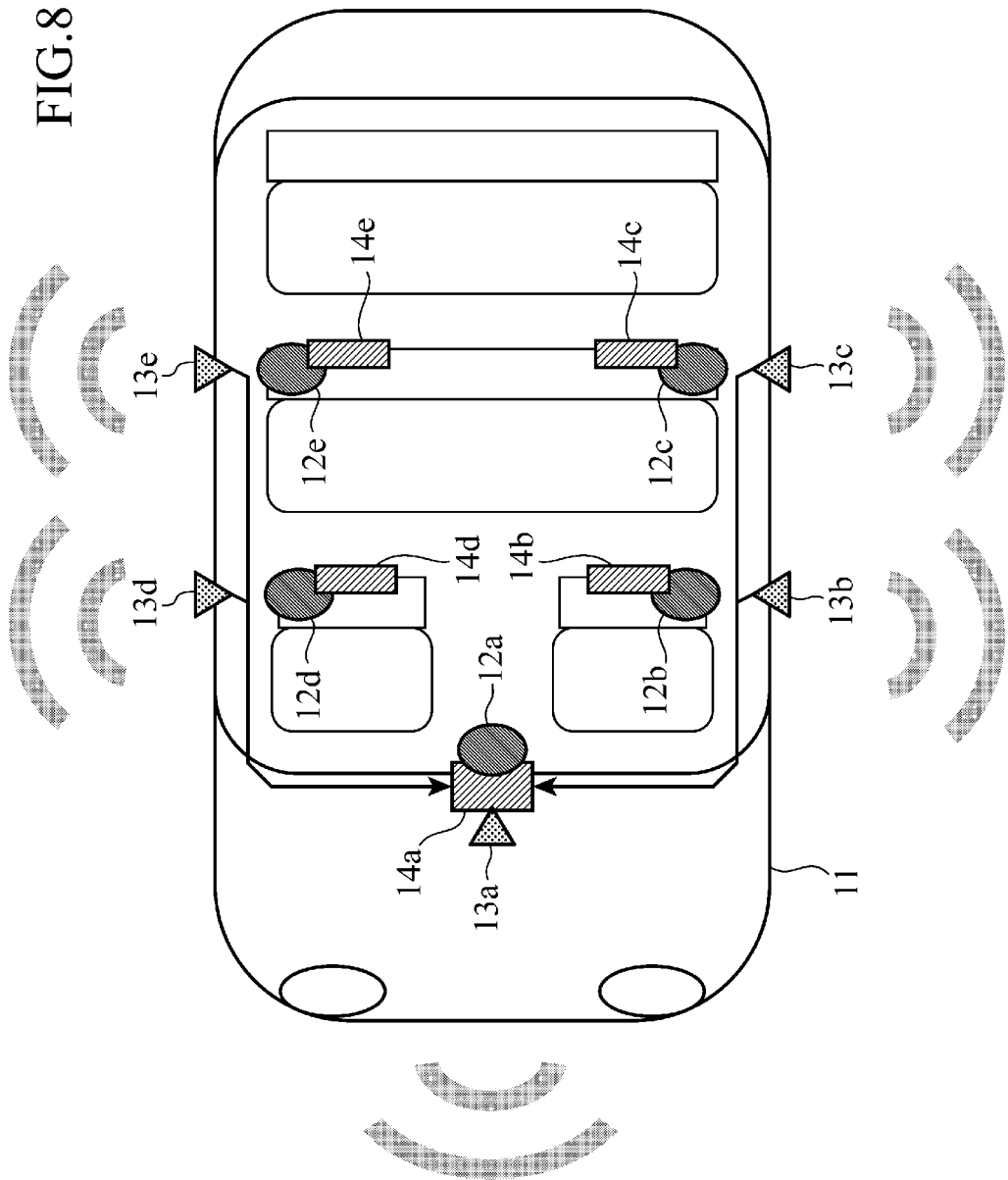
FIG. 8 is a diagram showing a system configuration of an onboard radio communication system of an embodiment 2 in accordance with the present invention.

FIG. 8 is a diagram showing a system configuration of an onboard radio communication system of an embodiment 2 in accordance with the present invention.

As shown in FIG. 8, the onboard radio communication system of the embodiment 2 in accordance with the present invention differs from the embodiment 1 shown in FIG. 1 in that the detection information items from the ultrasonic sensors 13a-13e are gathered into a single radio set (radio set 12a, here), and the radio set 12a delivers the adjacent vehicle detection information to the other radio sets 12b-12e using the report signals.

Then, as for selecting a radio set (one of 12a-12e) for carrying out interference detection of radio waves, and causing the radio set selected (one of 12a-12e) to control and execute the radio interference detection using the control signals, the embodiment 2 is the same as the embodiment 1. The set carrying out the interference detection of the radio wave, the radio set 12b, for example, reports the radio interference level and the scanning result of the frequency channels to the individual radio sets 12a and 12c-12e using the report signals. In addition, the radio set 12b decides the result, and performs the switching control of the frequency channel of the individual radio sets 12a-12e in the vehicle 11.

According to the embodiment 2 described above, it assigns the radio set 12a as a master radio set that gathers the detection information about the adjacent vehicle from one or more slave radio sets (12b-12e), that reports to the other radio sets using the report signals to select a slave radio set for making a radio interference decision, and that instructs the selected slave radio set to decide the presence or absence of the radio interference via the control signal.

In this way, it gathers the detection information items from the ultrasonic sensors 13a-13e into the single radio set 12a, and reports the adjacent vehicle detection information from the radio set 12a to the other radio sets 12b-12e using the report signals. Thus, as compared with the embodiment 1 in which the individual radio sets 12a-12e connected with the ultrasonic sensors 13a-13e make the report, the embodiment 2 can simplify its control and offers an advantage of being able to reduce the communication traffic. In addition, in the same manner as the embodiment 1, it can provide an onboard radio communication system capable of improving the performance by detecting with the adjacent vehicle detection unit the approach of the second vehicle containing the onboard radio communication system employing the same radio communication scheme, and by reducing the communication quality deterioration due to the radio interference using the radio interference decision unit and the frequency channel switching unit.

Embodiment 3

FIG. 9 is a diagram showing a system configuration of an onboard radio communication system of an embodiment 3 in accordance with the present invention.

As shown in FIG. 9, the onboard radio communication system of the embodiment 3 in accordance with the present invention differs from the embodiment 1 or 2 in that its ultrasonic sensors 13a-13e operating as the adjacent vehicle detection unit have radio sets 31a-31e for communications.

Thus, as for the adjacent vehicle detection information, since the fellow radio sets (12a-31a, 12b-31b, ..., 12e-31e) can transmit it between them, wiring becomes unnecessary, thereby being able to compactify the vehicle mounting space. As for the reporting of the position information about the adjacent vehicle via the report signals, and as for the radio interference detection and the switching control of the frequency channels, they are the same as those of the embodiment 1 or 2.

According to the onboard radio communication system of the embodiment 3 in accordance with the present invention, since it can reduce the need for wiring as compared with the embodiment 1 or 2, it can compactify the vehicle mounting space by that amount. In addition, as the embodiment 1 or 2, it can also provide an onboard radio communication system capable of improving the performance by detecting with the adjacent vehicle detection unit the approach of the second vehicle containing the onboard radio communication system employing the same radio communication scheme, and by reducing the communication quality deterioration due to the radio interference using the radio interference decision unit and the frequency channel switching unit.

Incidentally, the present invention is applicable not only to the onboard devices described in the foregoing embodiments 1-3, but also to a home radio communication system using a ultra wideband radio such as an AV (Audio Visual) network or a PC (Personal Computer) network to achieve similar advantages.

In addition, as for the functions of the individual component blocks of the radio sets 12a-12e of the onboard radio communication systems of the embodiments 1-3 in accordance with the present invention, all of them can be implemented by hardware, or at least part of them can be implemented by software.

For example, as for the data processing by the radio transmitting and receiving unit for achieving timing synchronization on a fixed-period radio communication frame basis, for assigning, to a prescribed period at a head portion in the frame, report signals for reporting state management information about the radio sets to other radio sets and control signals for controlling the individual radio sets to transmit and receive these signals, for selecting one of frequency channels capable of radio communications, and for transmitting and receiving the radio signals via the selected frequency channel in a time sharing manner; by the radio interference decision unit, which is started when the adjacent vehicle detection unit detects the adjacent second vehicle, for deciding the presence or absence of interference due to radio waves leaking from the second vehicle; and by the frequency channel switching unit for switching, when the radio interference decision unit decides that the radio interference is present, a frequency channel in use by scanning other switchable frequency channels, and by reporting a frequency channel with which the scanning succeeds to the other radio sets via the report signals, the data processing can be implemented by hardware, or at least part of it can be implemented by one or more programs on a computer.

INDUSTRIAL APPLICABILITY

As described above, to improve the performance by reducing the communication quality deterioration due to the radio interference even if a second vehicle containing an onboard radio communication system employing the same radio communication scheme is adjacent, an onboard radio communication system in accordance with the present invention is configured in such a manner that it has a radio network constructed by arranging a plurality of radio sets for transmitting and receiving radio signals in a first vehicle, and comprises: a radio transmitting and receiving unit for achieving timing synchronization on a fixed-period radio communication frame basis, for assigning, to a prescribed period at a head portion in the frame, report signals for reporting state management information about the radio sets to other radio sets and control signals for controlling the individual radio sets, for transmitting and receiving the report signals and the control signals, for selecting one of frequency channels capable of radio communications, and for transmitting and receiving the radio signals via the selected frequency channel in a time sharing manner; an adjacent vehicle detection unit for detecting a second vehicle adjacent to the first vehicle; a radio interference decision unit, which is started when the adjacent vehicle detection unit detects the adjacent second vehicle, for deciding the presence or absence of interference due to radio waves leaking from the second vehicle; and a frequency channel switching unit for switching, when the radio interference decision unit decides that the radio interference is present, a frequency channel in use by scanning other switchable frequency channels, and by reporting a frequency channel with which the scanning succeeds to the other radio sets via the report signals. Accordingly, it is suitable for application to an in-vehicle radio communication system.

What is claimed is:

1. An onboard radio communication system having a radio network constructed by arranging a plurality of radio sets within a first vehicle for transmitting and receiving radio signals in said first vehicle, the onboard radio communication system comprising:

a radio transmitting and receiving unit for achieving timing synchronization on a fixed-period radio communication frame basis, for assigning, to a prescribed period at a head portion in the frame, report signals for reporting state management information about the radio sets to other radio sets arranged within the first vehicle and control signals for controlling the individual radio sets arranged within the first vehicle, for transmitting and receiving the report signals and the control signals, for selecting one of frequency channels capable of radio communications, and for transmitting and receiving the radio signals via the selected frequency channel in a time sharing manner;

an adjacent vehicle detection unit for detecting a second vehicle adjacent to the first vehicle;

a radio interference decision unit, which is started when the adjacent vehicle detection unit detects the adjacent second vehicle, for deciding the presence or absence of interference due to radio waves leaking from the second vehicle based on a determination that the interference level exceeds a predetermined threshold value; and a frequency channel switching unit for switching, when the radio interference decision unit decides that the radio interference is present, a frequency channel in use by scanning other switchable frequency channels, and by reporting a frequency channel with which the scanning succeeds to the other radio sets arranged within the first vehicle via the report signals; and wherein the radio interference decision unit:

when deciding that the radio interference is present, reports to the other radio sets arranged within the first vehicle that the radio interference is present using the report signals; and instructs switching to a frequency channel without the radio interference using the control signals.

2. The onboard radio communication system according to claim 1, wherein the adjacent vehicle detection unit:

operates together with at least one of the plurality of radio sets; reports position information about the adjacent vehicle to the other radio sets using the report signals via a wire or wireless system; and instructs decision of the radio interference and switching of the frequency channel using the control signals.

3. The onboard radio communication system according to claim 1, wherein the radio interference decision unit is:

one of the plurality of radio sets, which is decided as closest to the adjacent vehicle from the position information output from the adjacent vehicle detection unit, and which is free from the radio communications.

4. The onboard radio communication system according to claim 1, wherein the radio interference decision unit:

measures, when the second vehicle detected with the adjacent vehicle detection unit uses the same frequency band as the frequency channel used within the first vehicle, a received signal strength indication of radio waves leaking from the second vehicle; and makes a decision as to the presence or absence of the radio interference by comparing the received signal strength indication with said predetermined threshold value.

5. The onboard radio communication system according to claim 1, wherein the radio interference decision unit:

when deciding that the radio interference is absent, lowers transmission outputs of the plurality of radio sets within a range that will not bring about quality deterioration of the radio communications in the first vehicle.

6. The onboard radio communication system according to claim 1, wherein the adjacent vehicle detection unit:

detects the adjacent vehicle by recognizing an image acquired with an onboard camera.

7. The onboard radio communication system according to claim 1, wherein the adjacent vehicle detection unit:

detects the adjacent vehicle using a ultrasonic sensor for emitting ultrasonic waves to an outside of the vehicle with a transmitter, and for measuring a distance by receiving reflected waves with a receiver.

8. The onboard radio communication system according to claim 1, wherein the adjacent vehicle detection unit:

detects the adjacent vehicle using a radar for emitting radio waves to an outside of the vehicle, and for measuring a distance by receiving reflected waves.

9. The onboard radio communication system according to claim 1, wherein the plurality of radio sets constituting the radio network comprises at least one master radio set, and one or more slave radio sets; and the master radio set gathers detection information items about the adjacent vehicle from the one or more slave radio sets and reports to the other radio sets using the report signals, selects a slave radio set for making an interference decision, and instructs the selected slave radio set to make a presence or absence decision of the radio interference via the control signals.

10. The onboard radio communication method according to claim 1, wherein the detecting step detects the adjacent vehicle using a radar for emitting radio waves to an outside of the vehicle, and for measuring a distance by receiving reflected waves.

11. An onboard radio communication method by utilizing a radio network constructed by arranging a plurality of radio sets within a first vehicle for transmitting and receiving radio signals in said first vehicle, the onboard radio communication method comprising:

achieving timing synchronization on a fixed-period radio communication frame basis, for assigning, to a prescribed period at a head portion in the frame, report signals for reporting state management information about the radio sets to other radio sets arranged within the first vehicle and control signals for controlling the individual radio sets arranged within the first vehicle, for transmitting and receiving the report signals and the control signals, for selecting one of frequency channels capable of radio communications, and for transmitting and receiving the radio signals via the selected frequency channel in a time sharing manner;

detecting a second vehicle adjacent to the first vehicle;

deciding the presence or absence of interference due to radio waves leaking from the second vehicle based on a determination that the interference level exceeds a predetermined threshold value; and switching, when deciding that the radio interference is present, a frequency channel in use by scanning other switchable frequency channels, and by reporting a frequency channel with which the scanning succeeds to the other radio sets arranged within the first vehicle via the report signals; and wherein the deciding step further comprising:

when deciding that the radio interference is present, reporting to the other radio sets arranged within the first vehicle that the radio interference is present using the report signals; and instructing switching to a frequency channel without the radio interference using the control signals.

12. The onboard radio communication method according to claim 11, wherein the detecting step further comprising:

reporting position information about the adjacent vehicle to the other radio sets using the report signals via a wire or wireless system; and instructing decision of the radio interference and switching of the frequency channel using the control signals.

13. The onboard radio communication method according to claim 11, wherein one of the plurality of radio sets is a radio interference decision unit which is decided as closest to the adjacent vehicle from the position information output from the adjacent vehicle detection step, and which is free from the radio communications.

14. The onboard radio communication method according to claim 11, wherein the deciding step further comprising:
 measuring, when the second vehicle detected with the detecting step uses the same frequency band as the frequency channel used within the first vehicle, a received signal strength indication of radio waves leaking from the second vehicle; and
 making a decision as to the presence or absence of the radio interference by comparing the received signal strength indication with said predetermined threshold value.

15. The onboard radio communication method according to claim 11, wherein the deciding step further comprising:
 when deciding that the radio interference is absent, lowering transmission outputs of the plurality of radio sets within a range that will not bring about quality deterioration of the radio communications in the first vehicle.

16. The onboard radio communication method according to claim 11, wherein the detecting step detects the adjacent vehicle by recognizing an image acquired with an onboard camera.

17. The onboard radio communication method according to claim 11, wherein the detecting step detects the adjacent vehicle using a ultrasonic sensor for emitting ultrasonic waves to an outside of the vehicle with a transmitter, and for measuring a distance by receiving reflected waves with a receiver.

18. The onboard radio communication method according to claim 11, wherein
 the plurality of radio sets constituting the radio network comprises at least one master radio set, and one or more slave radio sets; and
 the master radio set gathers detection information items about the adjacent vehicle from the one or more slave radio sets and reports to the other radio sets using the report signals, selects a slave radio set for making an interference decision, and instructs the selected slave radio set to make a presence or absence decision of the radio interference via the control signals.

* * * * *